United States Patent [19]  
Treseder et al.

[11] Patent Number: 4,556,969  
[45] Date of Patent: Dec. 3, 1985

[54] HERMETICALLY SEALED DISK FILE

[75] Inventors: Robert C. Treseder, Aptos; Thomas G. Savarese, Sunnyvale, both of Calif.

[73] Assignee: International Business Machines Corporation, Armonk, N.Y.

[21] Appl. No.: 687,215

[22] Filed: Dec. 28, 1984

[51] Int. Cl.⁴ .............. G11B 5/82; B65D 85/30
[52] U.S. Cl. .................. 369/291; 206/444; 360/97; 360/133
[58] Field of Search .......... 360/133, 137, 97; 206/444, 309; 369/291, 258

[56] References Cited  
U.S. PATENT DOCUMENTS

| | | | |
|---|---|---|---|
| 3,864,748 | 2/1975 | Herdman et al. | 360/133 |
| 3,902,195 | 8/1975 | Osako et al. | 360/133 |
| 4,367,502 | 1/1983 | Iftikar et al. | 360/133 |
| 4,367,503 | 1/1983 | Treseder | 360/133 |

FOREIGN PATENT DOCUMENTS 3340170 5/1984 Fed. Rep. of Germany ...... 360/133

OTHER PUBLICATIONS

*Removable Media Disk File*, Fugate et al., IBM Technical Disclosure Bulletin, vol. 20, No. 10, Mar. 78, pp. 4104, 4105.

Primary Examiner—Steven L. Stephan  
Attorney, Agent, or Firm—Thomas R. Berthold

[57] ABSTRACT

An improved hermetically sealed disk file is disclosed in which the axis of rotation of the disk spindle and the longitudinal axis of a surrounding cylindrical housing are positioned transverse to one another so that cross-sectional diameter of the housing need be only slightly larger than that of the disks mounted on the spindle.

6 Claims, 3 Drawing Figures

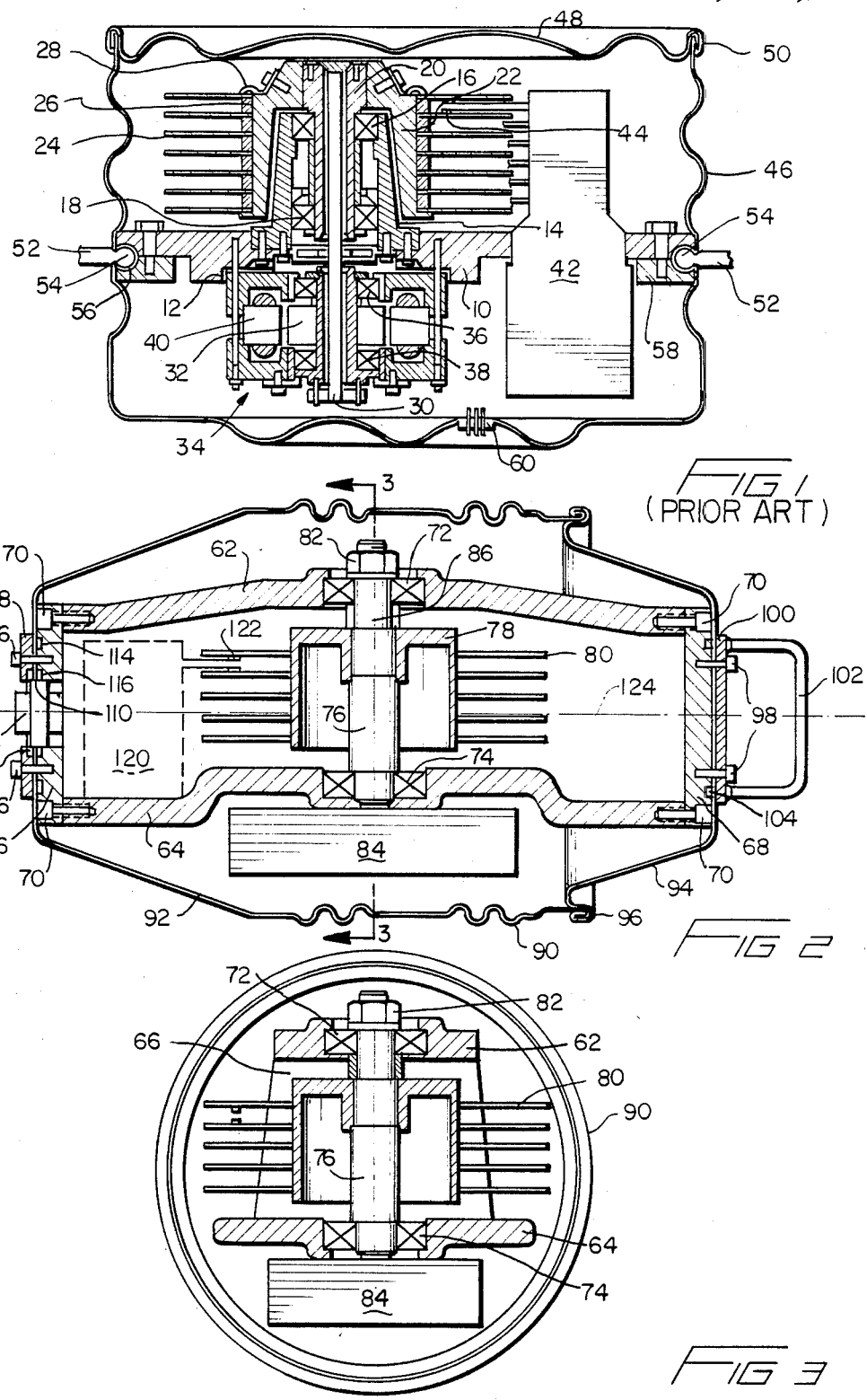

HERMETICALLY SEALED DISK FILE

TECHNICAL FIELD

This invention relates in general to disk files for data processing systems. More particularly, the invention is concerned with hermetically sealed disk files in which the disks, their supporting spindle and drive motor and an associated disk file actuator are enclosed within a sealed housing.

BACKGROUND ART

Hermetically sealed disk files have been known for some time, as shown, in U.S. Pat. No. 4,367,503 granted to Treseder, one of the present co-inventors. The advantages of hermetically sealing a magnetic or optical disk file are several. First, the file can be operated in a low density, inert gas atmosphere such as helium which reduces the aerodynamic drag between the disks and their associated read-write heads by a factor of approximately 5 to 1 compared to operation in air. At the same time, the helium gas more effectively conducts away heat generated during operation of the disk file.

A significant difficulty to be overcome when a disk file is hermetically sealed is to design the housing so that it will readily accommodate variations between its internal pressure and the ambient atmospheric pressure. Such variations can arise from normal temperature changes during operation, from changes in atmospheric pressure and, in an extreme instance, from extraordinary changes in ambient pressure during air shipment. In the latter case, a differential pressure of approximately 4 psi can be experienced.

FIG. 1 of this application shows a schematic, elevation view of a hermetically sealed disk file of the type disclosed in the Treseder patent. The essentially circular base plate 10 is provided at an off-center location with a stepped bore 12. On one side of plate 10 is attached, a frusto-conical bearing support member 14 which supports on its inner diameter a pair of spindle bearings 16,18. Within these bearings, a hollow spindle 20 is rotatably supported; and a spindle hub 22 is attached to the upper end of spindle 20. A plurality of disks 24, separated by spacing rings 26 and held in place on hub 22 by disk clamp 28, are provided for storage and retrieval of data.

A quill shaft 30 extends through hollow spindle 20 to the opposite side of base plate 10 where it is operatively connected to the rotor 32 of a spindle drive motor 34. Rotor 32 is mounted for rotation in a pair of rotor bearings 36,38 supported within the stator assembly 40 of motor 24. Motor 34, as illustrated, is attached to the underside of base plate 10. As indicated schematically, a disk actuator assembly 42 is supported on base plate 10 next to the spindle and disk assembly so that its read-write heads 44 can be moved into position to receive or transmit data from or to the disks 24. A suitable actuator for such an application is disclosed in U.S. Pat. No. 3,849,800, for example.

The previously described structure is enclosed within a deep drawn, corrugated sheet metal enclosure 46 which is closed at its upper end by a corrugated sheet metal cover 48. Enclosure 46 and cover 48 are hermetically joined to one another by a conventional double seamed viscoelastic seal 50 such as is commonly used in the canning industry. Typical materials for the viscoelastic material used in such seals are disclosed in the Treseder patent. A plurality of mounting brackets 52, each having a rounded end 54 are provided to engage an inwardly projecting, circumferentially extending corrugation 56 in enclosure 46. Within the enclosure, base plate 10 is secured to corrugation 56 by means of a clamping ring 58. Finally, power for motor 34 and disk file actuator 42 is brought into the sealed enclosure through an electrical feedthrough connector 60 of a type known in the art.

As can be seen in FIG. 1, a hermetically sealed disk file of the type disclosed in the Treseder patent requires a cylindrical enclosure 46,48 having an outer diameter approximately twice that of the enclosed disks 24. As a result of this, the end panels of the enclosure 46,48 undergo relatively large deflections due to changes in pressure and temperature. The maximum deflection of a circular end panel can be shown to be a function of the diameter of the end panel raised to the fourth power. Thus, a cylindrical enclosure having a diameter approximately twice the diameter of the disk file will deflect approximately 16 times more than would an enclosure having a diameter about equal to that of the disks. In the disk file shown in FIG. 1, the amount of disk deflection can be reduced by increasing the thickness of the end panels; however, this also increases the weight of the disk file.

DISCLOSURE OF THE INVENTION

An object of the invention is to provide an improved hermetically sealed disk file in which the cylindrical housing of the disk file has a substantially reduced diameter, thereby reducing deflection of the end walls of the housing and minimizing the weight of the housing.

A further object of the invention is to provide such a hermetically sealed disk file in which the housing has sufficient flexibility so that only minimal forces are applied to the enclosed support structure for the disk file, upon deflection of the housing due to temperature and pressure variations.

These objects of the invention are given only by way of example. Therefore, other desirable objectives and advantages inherently achieved by the disclosed structure may occur or become apparent to those skilled in the art. Nonetheless, the scope of the present invention is to be limited only by the appended claims.

In a hermetically sealed disk file according to the invention, at least one mounting plate rotatably supports a disk spindle having a first axis. At least one disk is mounted on the spindle for rotation about the first axis, the disk having a first outer diameter. An elongated, cylindrical housing encloses the mounting plate, spindle and disk, this housing having a second longitudinal axis which is transverse, preferably perpendicular, to the first axis. The mounting plate is attached to the housing. Preferably, the housing has an essentially circular cross-section transverse to the second axis. Because the first and second axes are transverse to one another, the cross-section of the housing can have a diameter which is only slightly larger than that of the disks mounted on the spindle.

To provide a particularly secure mounting for the spindle, two mounting plates can be used with the spindle rotatably mounted therebetween. In such a case, the mounting plates are attached to the housing by a pair of end plates which extend between the support plates at the opposite ends of the housing and are attached to the housing. To provide rigidity against radial deflection but to allow some axial deflection due to differential pressure between the interior and exterior of the housing, the housing preferably comprises circumferentially extending corrugations. The drive motor for the spindle may be mounted on the opposite side of the mounting plate from the disks.

BRIEF DESCRIPTION OF THE DRAWING

FIG. 1 shows an elevation view, partially schematic, of a prior art hermetically sealed disk file.

FIG. 2 shows an elevation view, partially schematic, of a hermetically sealed disk file according to the present invention.

FIG. 3 shows a view taken along line 3—3 of FIG. 2.

BEST MODE FOR CARRYING OUT THE INVENTION

The following is a detailed description of a preferred embodiment of the invention, reference being made to the drawing in which like reference numerals identify like elements of structure in each of several figures.

FIGS. 2 and 3 illustrate a hermetically sealed disk file according to the present invention in which the previously described problem of the prior art hermetically sealed disk files is resolved by orienting the axis of rotation of the disk file transverse, preferably perpendicular, to the longitudinal axis of the surrounding housing. The disk file comprises an upper mounting plate 62 and a lower mounting plate 64 secured to one another in substantially parallel, spaced relationship by a pair of end plates 66,68 and a plurality of suitable cap screws 70. Although two mounting plates are preferred to provide a more rigid support structure for the disk file, it is also within the scope of the invention to use a single mounting plate from which the spindle is cantilevered. The mounting plates support a pair spindle bearings 72,74 within which a spindle 76 is mounted for rotation. A cylindrical spindle hub 78 is suitably attached to spindle 76 and one or more circular disks 80 are attached to hub 78 in any suitable manner, such as that illustrated in FIG. 1. At its upper end, spindle 76 is secured by a nut 82. At its lower end on the opposite side of mounting plate 64, spindle 76 is operatively engaged with the rotor of a suitable drive motor 84 attached to the underside of mounting plate 64. Spindle 76 has an axis of rotation 86.

The structure just described is enclosed within an elongated, essentially cylindrical and circumferentially corrugated disk file housing 90. The housing comprises a pair of complementary deep drawn and essentially cylindrical sheet metal containers 92,94 which are hermetically joined at their lips by a double seamed viscoelastic seal 96. As shown in FIG. 3, the inside diameter of housing 90 need be only slightly larger than the diameter of the disks 80. As a result of this configuration, the deflection of the end walls of the container is greatly reduced and the container may be made of thinner material to reduce its weight.

The support frame comprised of mounting plates 62,64 and end plates 66,68 is attached to housing 90 at one end by means of cap screws 98 which extend through a base plate 90 of a carrying handle 102 to engage end plate 68. A circular C-seal 104 between housing 90 and end plate 68 prevents leakage past cap screws 98 into the interior of the housing. At the opposite end of the housing, a plurality of cap screws 106 extend through an annular clamping plate 108 to engage end plate 66. Clamping plate 108 surrounds an opening 110 provided through end plate 66 and housing 90. Within opening 110 is positioned an electrical connector 112. A pair of concentric C-seals 114, 116 prevent leakage past cap screws 106 and connector 112 on the inside of housing 90, while a further C-seal 118 prevents leakage past connector 112 on the outside of housing 90. A suitable disk actuator mechanism 120, illustrated in phantom in FIG. 2, can be mounted between mounting plates 62,64 or on one of end plates 66,68, as desired, in position to allow its read-write heads 122 to interact with disks 80 in the familiar manner. As can be seen clearly in FIG. 2, the longitudinal axis 124 of housing 90 is transverse to the axis of rotation 86 of spindle 76. Preferably these axes are perpendicular to one another.

Having described our invention in sufficient detail to enable those skilled in the art to make and use it, we claim as new and desire to secure Letters Patent of the United States for:

1. An improved hermetically sealed disk file, comprising:
   at least one mounting plate;
   a spindle having a first axis, said spindle being rotatably mounted on said mounting plate;
   at least one disk mounted on said spindle for rotation about said first axis, said disk having a first outer diameter;
   an elongated, cylindrical housing enclosing said mounting plate, spindle and disk, said housing having a second axis transverse to said first axis; and
   means for attaching said mounting plate to said housing.

2. An improved disk file according to claim 1, wherein said housing has an essentially circular cross-section transverse to said second axis, said cross-section having a second diameter only slightly larger than said first diameter.

3. An improved disk file according to claim 1, wherein there are two of said mounting plates and said spindle is rotatably mounted therebetween; and said means for attaching comprises a pair of end plates extending between said support plates at opposite ends of said housing and means for attaching said housing to said end plates.

4. An improved disk file according to claim 3, wherein said spindle extends beyond one of said mounting plates, further comprising a motor mounted on the opposite side of said one mounting plate and operatively connected to said spindle.

5. An improved disk file according to claim 1, wherein said housing comprises circumferentially extending corrugations to accommodate differential pressure between the interior and exterior of said housing.

6. An improved disk file according to claim 1, wherein said second axis is perpendicular to said first axis.

* * * * *